(12) United States Patent
Yu

(10) Patent No.: US 8,543,140 B2
(45) Date of Patent: Sep. 24, 2013

(54) METHOD AND APPARATUS FOR DETERMINING PAGING TIME

(75) Inventor: Yinghui Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 12/793,480

(22) Filed: Jun. 3, 2010

(65) Prior Publication Data

US 2010/0248752 A1    Sep. 30, 2010

(30) Foreign Application Priority Data

Dec. 3, 2007   (CN) .......................... 2007 1 0077484

(51) Int. Cl.
*H04W 68/00*      (2009.01)
(52) U.S. Cl.
USPC ......... 455/458; 455/422.1; 370/328; 370/338
(58) Field of Classification Search
USPC ................... 455/458, 422.1; 370/328–338
See application file for complete search history.

(56) References Cited

U.S. PATENT DOCUMENTS

| 2004/0023672 | A1* | 2/2004 | Terry ............................ 455/458 |
| 2004/0229605 | A1* | 11/2004 | Hwang et al. .............. 455/426.1 |
| 2005/0164719 | A1 | 7/2005 | Waters |
| 2007/0161384 | A1* | 7/2007 | Terry ............................ 455/458 |
| 2010/0279715 | A1* | 11/2010 | Alanara et al. ................ 455/458 |

FOREIGN PATENT DOCUMENTS

| CN | 1430359 A | 7/2003 |
| CN | 1784076 A | 6/2006 |
| CN | 1949920 A | 4/2007 |
| WO | 2004013978 A2 | 2/2004 |
| WO | 2006071051 A1 | 7/2006 |

OTHER PUBLICATIONS

3GPP TS 36.304 V1.0.0: "3rd Generation Partnership Project; Technical Specification Group Radio Access Network; Evolved Universal Terrestrial Radio Access (E-UTRA) User Equipment (UE) procedures in idle mode (Release 8)," Jun. 2007, 24 pages.
3GPP TSG-RAN WG2 #58bis, LG Electronics: "Transmission of LTE Paging," Jun. 25-29, 2007, 3 pages.
Office action issued in corresponding Chinese patent application No. 200710077484, Sep. 4, 2009, 8 pages.
Office action issued in corresponding Chinese patent application No. 200710077484, Feb. 12, 2010, 6 pages.
Written Opinion issued in corresponding PCT application No. PCT/CN2008/073204, Mar. 5, 2009, 3 pages.
Foreign Communication From a Related Counterpart Application—Chinese Office Action, CN200710077484.X, Sep. 4, 2009, 8 pages.
3GPP TSG-RAN2 Meeting #58b Tdoc zR2-072513: "Idle mode paging," Orlando, US, Samsung, dated Jun. 25-29, 2007, 4 pages total.
3GPP TSG-RAN WG 2 meeting #60 R2-074811: "Paging mechanism," Jeju, Korea, Qualcomm Europe, dated Nov. 5-9, 2007, 4 pages total.

(Continued)

*Primary Examiner* — Chuong A Ngo

(57) ABSTRACT

The technical solution under the present invention determines paging time by determining the position of the radio subframe that includes a paging identifier, with a view to ensuring energy efficiency of a User Equipment (UE). Network-side and user-side paging apparatus and methods are disclosed to perform the paging time determination steps of the invention.

20 Claims, 3 Drawing Sheets

(56) References Cited

OTHER PUBLICATIONS

3GPP TSG-RAN WG2 Meeting #60 R2-074877: "Paging DRX calculation in LTE," Jeju, South Korea R2-073928, Nokia Corporation, Nokia Siemens Networks, dated Nov. 5-9, 2007, 2 pages total.

TSG-RAN WG2 Meeting #60 Tdoc R2-075246: "Text proposal for P-BCH, D-BCH, PCH handling," Jeju Island, Korea, Ericsson, dated Nov. 5-9, 2007, 3 pages total.

Front page corresponding granted Chinese Patent No. 102098783 (Application No. 201110060452.5) citing prior art at Item (56), issued Dec. 12, 2012, 1 page only.

* cited by examiner

METHOD AND APPARATUS FOR DETERMINING PAGING TIME

CROSS-REFERENCE TO RELATED APPLICATIONS

This application is a continuation of International Application No. PCT/CN2008/073204, filed on Nov. 26, 2008, which claims priority to Chinese Patent Application No. 200710077484.X, filed on Dec. 3, 2007, both of which are hereby incorporated by reference in their entireties.

FIELD OF THE INVENTION

The present invention relates to the mobile communications field, and in particular, to a method and an apparatus for determining paging time.

BACKGROUND

The Universal Mobile Telecommunications System (UMTS) is a radio communication network technology standard defined by the 3rd Generation Partnership Project (3GPP) organization.

In UMTS, a basic process of paging is related to two channels: a Paging Indication Channel (PICH), and a Paging Channel (PCH). The PICH is a fixed-rate physical channel (with the spread factor being 256), and the PICH is elaborated in 3GPP TS25.211 v4.2.0. FIG. 1 shows a frame structure of the PICH. The length of a PICH radio frame is 10 ms, which is composed of 300 bits. Of those bits, 288 bits (b0, b1 , . . . , b287) bear the Paging Indication (PI), and the remaining 12 bits are reserved for future use and are not sent. One PI is composed of several bits. Depending on the length of one PI, each PICH frame may bear 18, 36, 72, or 144 PIs. The quantity of PIs carried in one PICH frame is denoted by Np. A Secondary Common Control Physical Channel (SCCPCH) bears the PCH. The PCH carries the specific content of the paging message, for example, User Equipment (UE) Identifier (ID), paging cause, and Circuit Switched (CN) domain ID. The PICH is correlated with the SCCPCH. A tail of the PICH radio frame is ahead of the SCCPCH correlated with PICH radio frame by 7680 chips.

FIG. 2 shows UE paging in a UMTS in the prior art.

After registering with a network, the UE is assigned to a paging group. Each paging group has a corresponding PI. When the UE in the paging group is paged, the PI corresponding to the paging group appears on the PICH periodically. After detecting the PI on the PICH, the UE starts receiving the specific paging message from the PCH through the SCCPCH. The upper layer of the protocol of the UE interprets the paging message.

The UE receives information in Discontinuous Reception (DRX) mode. Through the DRX mode, the UE is in a sleep mode when it is in an idle mode, and thus the power consumption is low. When the UE detects a PI of the UE, the UE awakens to receive the specific paging message. The UE monitors the PI periodically. If the period for monitoring the PI is longer, the chance for the UE to awaken is slim, and the UE is more energy-efficient. The UE, however, slowly responds to the network paging.

In UMTS, the UE obtains the content of the paging message in three steps:

Step 1. A System Frame Number (SFN) that includes the paging occasion is determined.

k indicates CN domain-specific DRX Cycle Length coefficient of the UE and the value range is 6≦k≦9; and a Paging Block Period (PBP) ranges from 4 to 64 in a TDD mode, and the PRB is 1 in the FDD mode. Therefore, in the idle mode, the DRX Cycle Length is calculated through Formula 2.1, and is expressed in radio frames.

$$\text{DRX Cycle Length} = \max(2^k, \text{PBP}) \quad \text{Formula 2.1}$$

Further, the SFN that includes the paging occasion of the UE is calculated through Formula 2.2.

$$\text{SFN} = \{(\text{IMSI div } M) \bmod (\text{DRX Cycle Length div PBP})\} * \text{PBP} + n * \text{DRX Cycle Length} + \text{Frame Offset} \quad \text{Formula 2.2}$$

In the above Formula 2.2, M is the quantity of SCCPCHs that bear the PCHs; Frame Offset is the offset of the frame, which is 0 in the FDD mode; n is a non-negative integer, and the value of n is acceptable only if the calculated value of SFN is less than the maximum value 4095 of the SFN allowed by the system.

Step 2. A position of the PI to be decoded in the radio frame is determined.

The position of the PI in the radio frame is calculated through Formula 2.3 and Formula 2.4 according to an International Mobile Subscriber Identifier (IMSI) and a DRX Index of the UE.

$$\text{DRX Index} = \text{IMSI div } 8192 \quad \text{Formula 2.3}$$

$$PI = \text{DRX Index} \bmod Np \quad \text{Formula 2.4}$$

The UMTS employs an SFN-based glide mechanism to calculate the actual position (q) of the PI in the radio frame more precisely. The calculation of the position (q) is performed through Formula 2.5. The SFN changes with time. The position (q) of the PI glides with the change of the SFN.

$$q = \left( PI + \left\lfloor ((18 \times (SFN + \lfloor SFN/8 \rfloor + \lfloor SFN/64 \rfloor + \lfloor SFN/512 \rfloor)) \bmod 144) \times \frac{Np}{144} \right\rfloor \right) \bmod Np \quad \text{Formula 2.5}$$

Step 3. The PCH is read to obtain the specific content of the UE paging message.

Pq denotes the value of the PI in the position q. If Pq=0, it indicates that the PI is invalid, and the UE dose not need wakeup. If Pq=1, it indicates that the PI is valid, and the UE needs wakeup. According to the corresponding position relation between the PICH and the SCCPCH that bears the PCH, the specific content of the paging message is read.

As described above, in UMTS, the UE calculates the SFN that includes the paging according to the IMSI and the DRX Index, and uses Np to calculate the actual position (for example, bit position or bit group position) of the PI to be decoded in the radio frame. The UE reads the PCH according to the corresponding position relation between the PICH and the SCCPCH that bears the PCH, and obtains the specific content of the UE paging message.

Meanings of the symbols involved in the foregoing formula (applicable to the following text) are: mod means modulo operation, div means division and round-off, ⌊ ⌋ means round-down, and max (a, b) means a greater value among a and b.

A Long Term Evolution (LTE) project is intended for the mobile communication architecture to be developed by the 3GPP organization in the coming 10 years. FIG. 3 shows a structure of a radio frame applied in LTE. One frame is 10 ms, and is composed of 10 radio sub-frames, with each radio sub-frame being 1 ms. One radio sub-frame includes two timeslots, namely, each timeslot is 0.5 ms.

FIG. 4 shows a structure bearer of a radio sub-frame applied in LTE. One radio sub-frame includes 14 Orthogonal Frequency Division Multiplexing (OFDM) symbols, where the first three OFDM symbols bear the Physical Downlink Control Channel (PDCCH), and the last 11 OFDM symbols bear the Physical Downlink Shared Channel (PDSCH). The PDCCH bears the Paging Radio Network Temporary Identifier (P-RNTI), and the PCH mapped onto the PDSCH bears the specific content of the paging message.

The prior art described above reveals that: Compared with UMTS, LTE does not define PICH or PI, but defines a PCH for bearing the paging content. Meanwhile, the channel bearer unit changes from the 10-ms radio frame to the 1-ms radio sub-frame. There are many other systems like the LTE whose physical channel type and structure are different from those of the UMTS. In such systems, the computation of the paging occasion in UMTS in the prior art is not applicable any more, and such systems are unable to determine the paging time.

SUMMARY

A method for determining paging time is disclosed in an embodiment of the present invention. The method includes the following steps. Determine an SFN of a radio frame that includes a paging identifier, and determine an SFN of the radio sub-frame that includes the paging identifier in the radio frame.

Another method for determining paging time is disclosed in an embodiment of the present invention. The method includes the following steps. Determine an SFN of a radio sub-frame that includes the paging identifier.

A network-side paging apparatus is disclosed in an embodiment of the present invention to perform the steps of the network-side device in the method embodiment, and a user-side paging apparatus is disclosed in an embodiment of the present invention to perform the steps of the user-side device in the method embodiment of the present invention.

The foregoing solution reveals that: The method under the present invention determines the paging time by determining the position of the radio sub-frame that includes the paging identifier, and this method ensures energy efficiency of the UE.

DETAILED DESCRIPTION

The technical solution under the present invention is expounded below with reference to the accompanying drawings. The embodiments described herein are only part of the embodiments of the present invention. Those skilled in the art can derive other embodiments from the embodiments described herein without making any creative effort, and all such embodiments are meant to be encompassed by the scope of the claims submitted herewith.

At the network side, the network device sends a paging identifier (e.g., P-RNTI) and a paging message to a specific UE at specific time (namely, specific radio sub-frame). The specific time can be calculated according to the UE identifier, the DRX period length of the UE, quantity of paging occasions within the DRX period, and the quantity of radio sub-frames for paging in one radio frame.

At the user side, the UE decodes the specific radio sub-frame to obtain the paging message in the same way as the operation at the network side. Specifically, the UE in the idle state decodes the PDCCH at the specific time (namely, specific radio sub-frame). If the P-RNTI over the PDCCH is obtained, it indicates that a paging message exists, and the UE awakens and decodes the PDSCH radio sub-frame that bears the specific paging content to finally obtain the paging content. The UE under the present invention uses the DRX mode to accomplish energy efficiency of the UE.

In the embodiments of the present invention, paging occasion refers to the position (namely, SFN) of the radio frame that includes the paging message in the DRX period, and paging time means the position of the radio sub-frame that includes the paging identifier.

Figure 1:
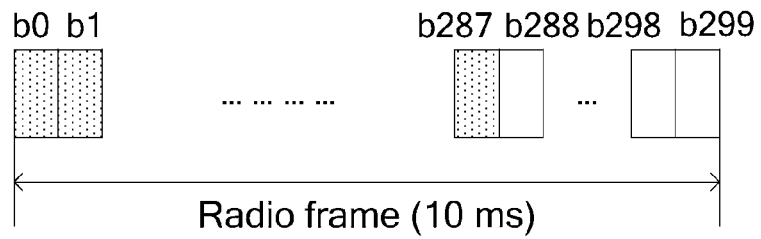
FIG. 1 shows a structure of a PICH radio frame in a UMTS system in the prior art.
Figure 2:
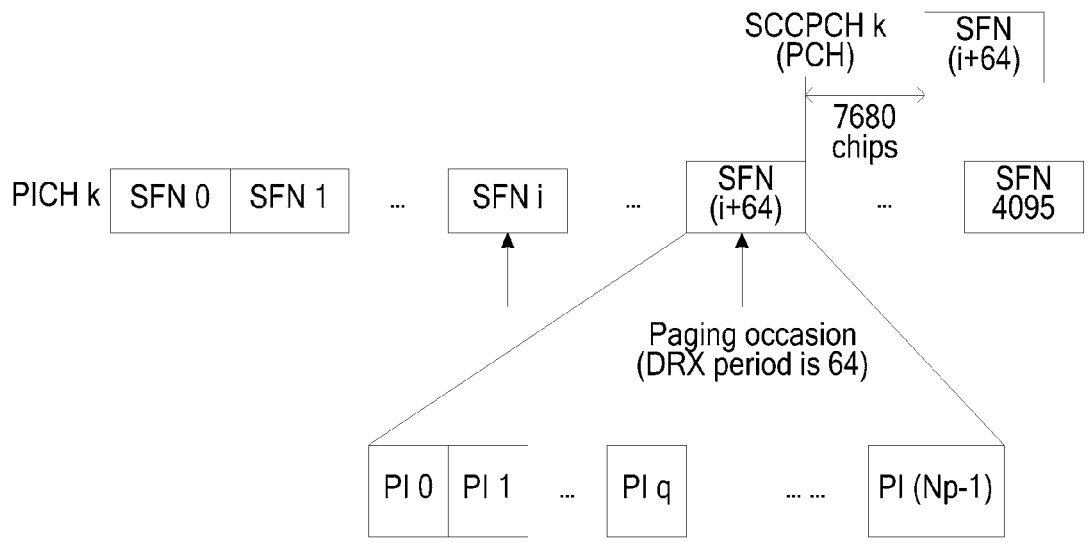
FIG. 2 shows UE paging in a UMTS system in the prior art.
Figure 3:
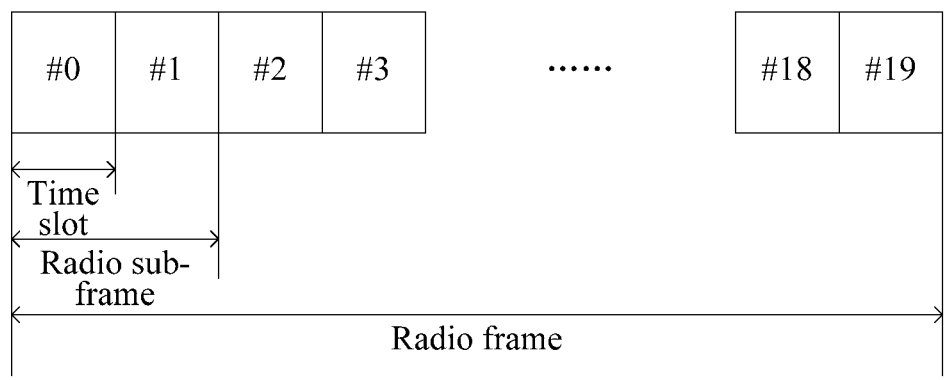
FIG. 3 shows a radio frame structure applied in an LTE system in the prior art.
Figure 4:
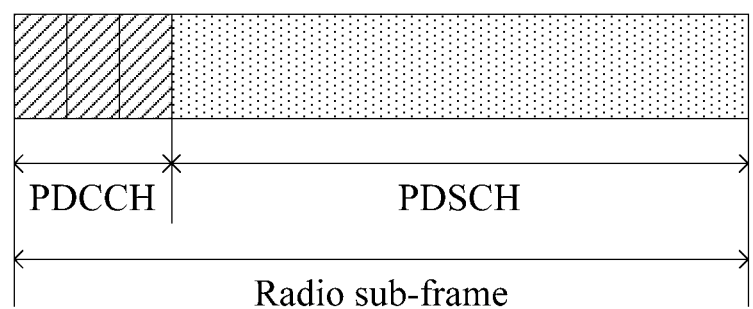
FIG. 4 shows a radio sub-frame structure bearer applied in an LTE system in the prior art.
Figure 5:
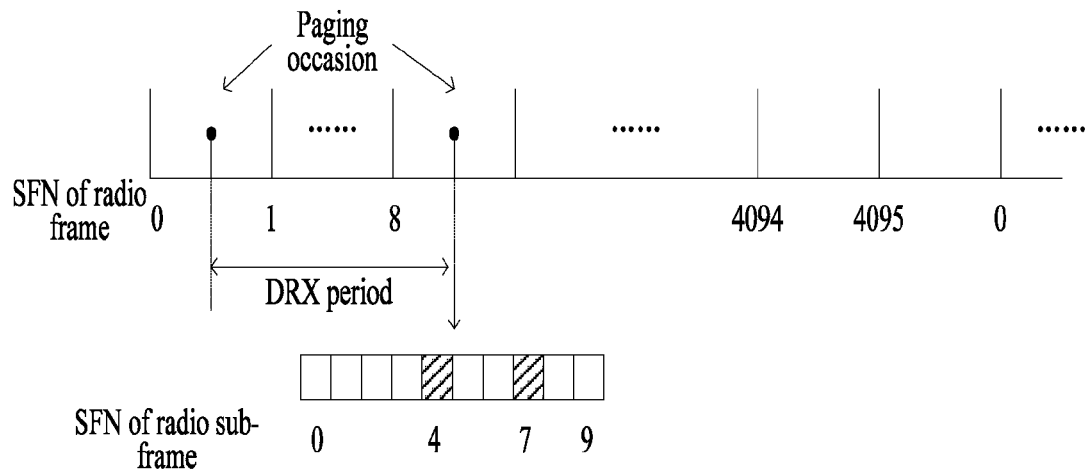
FIG. 5 shows paging time in an embodiment of the present invention.

FIG. 5 shows paging time in an embodiment of the present invention. At the network side, the SFN of radio frames ranges from 0 to 4095. Specifically, the SFN of the radio frame subsequent to the radio frame numbered "SFN 4095" is 0. The DRX period length of the network side is not less than $2^k$ frames ($3 \leq k \leq 9$). As shown in FIG. 5, when k is 3, the DRX period length is 8. Both the radio frame numbered "SFN 0" and the radio frame numbered "SFN 8" correspond to the paging occasion. Taking the radio frame numbered "SFN 8" as an example, the paging occasion is located on the radio sub-frame numbered 4 and the radio sub-frame numbered 7.

The UE calculates the paging time in the following steps:

1. The paging occasion (SFN of radio frame) is determined.

PAGING_DRX_PERIOD indicates the DRX period length of the UE. If the value of PAGING_DRX_PERIOD is specified by the network uniformly, the UE may read the value from a network broadcast when the UE resides onto a cell. If the value is specified by the network for a specific UE, the network tells the value to the UE through signaling.

UE_ID indicates a UE identifier. The UE identifier may be an IMSI written into the SIM card of the UE, an IMSI-related ID (such as IMSI mod X, where X is a positive integer), or a Temporary Mobile Station Identifier (TMSI) allocated by the core network to the UE when the UE is attached to the network.

PAGING_OCCASION_NUMBER indicates the quantity of paging occasions of the UE within the DRX period.

Frame Offset indicates offset of a frame, and is a non-negative integer not greater than the maximum value of the SFN of the radio frame.

M indicates the quantity of radio sub-frames suitable for paging in one radio frame. M is a non-negative integer not greater than the quantity of radio sub-frames in one radio frame. For example, in an LTE system, the quantity of radio sub-frames in a radio frame is 10 ($0 \leq M \leq 10$). Especially, if the value of M is 0, it indicates that no radio sub-frame for paging exists in the radio frame. M is set by the system. When the UE enters the cell, M may be read and obtained from the network broadcast.

Therefore, the paging occasion may be determined according to Formula 5.1.1 or Formula 5.1.2. n is a non-negative integer which makes the calculated SFN value not greater than the maximum SFN value.

$$\text{SFN} = (\text{PAGING\_DRX\_PERIOD div PAGING\_OCCASION\_NUMBER}) * (\text{UE\_ID mod PAGING\_OCCASION\_NUMBER}) + n*\text{PAGING\_DRX\_PERIOD} + \text{Frame Offset} \quad \text{Formula 5.1.1}$$

$$\text{SFN} = \{(\text{UE\_ID div } M) \text{ mod } (\text{PAGING\_DRX\_PERIOD div PAGING\_OCCASION\_NUMBER})\} * \text{PAGING\_OCCASION\_NUMBER} + n*\text{PAGING\_DRX\_PERIOD} + \text{Frame Offset} \quad \text{Formula 5.1.2}$$

2. The paging time (radio sub-frame position q) is determined.

The DRX Index may be calculated through Formula 5.2.

$$\text{DRX Index} = \text{IMSI div } Y \quad \text{Formula 5.2}$$

Y is a parameter. The value of Y may be specified by the network in view of the performance indices. For example, taking LTE as an example, the network may specify the value of Y to be 8192, or another value greater than $2^9$. The value of Y may also be calculated according to the M and the DRX period length. In different systems, the M and the DRX period length may have different values. Taking the LTE system as an example, when the maximum value of M is 10 and the maximum value of the DRX period length is $2^9$, then:

$$Y = M_{max} * \text{PAGING\_DRX\_PERIOD}_{max} = 2^9 * 10 = 5120.$$

Further, the paging time may be determined through Formula 5.3 according to the DRX Index and the M.

$$q = \text{DRX Index mod } M \quad \text{Formula 5.3}$$

In this embodiment, the UE determines the paging occasion first, namely, the position of the radio frame that includes the P-RNTI, and then determines the paging time, namely, the position of the radio sub-frame that includes the P-RNTI. With this method, the UE needs to decode only one radio sub-frame, without the need of decoding the whole radio frame. The paging time can be determined and the UE is more energy-efficient.

It is understandable to those skilled in the art that the paging time determined by the network needs to be consistent with the paging time determined by the UE. For the network side, the parameters involved in this embodiment can be configured or obtained. Therefore, the method of determining the paging time in this embodiment is applicable to the network-side device as well.

Figure 6:
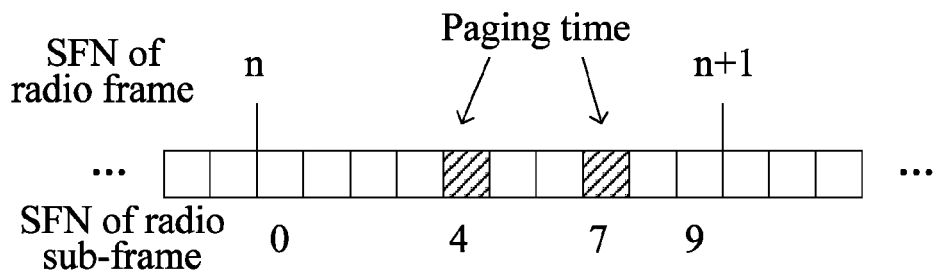
FIG. 6 shows paging time in another embodiment of the present invention.

FIG. 6 shows paging time in another embodiment of the present invention. At the network side, the SFN of radio frames ranges from 0 to 4095. Specifically, the SFN of the radio frame subsequent to the radio frame numbered "SFN 4095" is 0. The DRX period length of the network side is not less than $2^k$ frames ($3 \leq k \leq 9$). As shown in FIG. 6, the paging time is located in the radio sub-frame numbered 4 and the radio sub-frame numbered 7. The foregoing two radio sub-frames are located in the radio frame whose SFN is n.

The UE calculates the paging time, namely, determines the radio sub-frame position "Sub-frame Index" in the following process:

PAGING_DRX_PERIOD denotes the DRX period of the UE.

UE_ID indicates a UE identifier. The UE identifier may be an IMSI written into the SIM card of the UE, an IMSI-related ID (such as IMSI mod X, where X is a positive integer), or a TMSI allocated by the core network to the UE when the UE is attached to the network.

PAGING_OCCASION_NUMBER indicates the quantity of paging occasions of the UE within the DRX period.

Q is the quantity of radio sub-frames in a radio frame. In an LTE system, the value of Q is 10.

Sub-frame Offset indicates offset of a radio sub-frame, and is a non-negative integer not greater than (4096*Q−1).

Therefore, the paging time may be determined through Formula 6.1. n is a non-negative integer which makes the calculated Sub-frame Index value not greater than the maximum SFN value (namely, 4096*Q−1) allowed by the system.

$$\text{Subframe Index} = (\text{PAGING\_DRX\_PERIOD}*Q \text{ div PAGING\_OCCASION\_NUMBER}) * (\text{UE\_ID mod PAGING\_OCCASION\_NUMBER}) + n*\text{PAGING\_DRX\_PERIOD}*Q + \text{Subframe Offset} \quad \text{Formula 6.1}$$

In this embodiment, the UE may determine the paging time directly, namely, the position of the radio sub-frame that includes the P-RNTI. Optionally, the UE may further determine the paging occasion, namely, the position of the radio frame that includes the P-RNTI, and then determine the position of the foregoing radio sub-frame more conveniently. The UE may determine the paging occasion through Formula 6.2. Frame Offset indicates offset of a frame, and is a non-negative integer not greater than the maximum SFN value.

$$\text{SFN} = \text{Subframe Index div } Q + \text{Frame Offset} \quad \text{Formula 6.2}$$

In this embodiment, the UE needs to decode only one radio sub-frame, without the need of decoding the whole radio frame. The paging time can be determined and the UE is more energy-efficient.

It is understandable to those skilled in the art that the paging time determined by the network needs to be consistent with the paging time determined by the UE. For the network side, the parameters involved in this embodiment can be configured or obtained. Therefore, the method of determining the paging time in this embodiment is applicable to the network-side device as well.

Although the foregoing description quotes some parameters and communication concepts in the LTE, the present invention is applicable to multiple systems on the whole so long as a PCH for bearing paging exists in the system and the radio frame is composed of at least one radio sub-frame.

Although the invention has been described through preferred exemplary embodiments, the invention is not limited to such embodiments. It is apparent that those skilled in the art can make modifications and variations to the invention without departing from the scope of the invention. The invention is intended to cover the modifications and variations provided that they fall in the scope of protection defined by the following claims or their equivalents.

What is claimed is:

1. A method for facilitating a network device's capability to page a user equipment (UE), the method comprising:
   determining a System Frame Number (SFN) of a radio frame, wherein the radio frame is designated for carrying a Paging Radio Network Temporary Identifier (P-RNTI) for a paging of the UE by the network device, the radio frame comprising a plurality of radio sub-frames, and the P-RNTI being configured to be transmitted by the network device to the UE in a Physical Downlink Control Channel (PDCCH) within one of the plurality of the radio sub-frames in the radio frame; and
   determining a position of the radio sub-frame configured to be used in the transmission of the P-RNTI, wherein the determining the position includes consideration of parameters including an International Mobile Subscriber Identifier (IMSI) of the UE being paged, a Discontinuous Reception (DRX) period length of the UE being paged, and a quantity of radio sub-frames suitable for the paging in the radio frame.

2. The method of claim 1, wherein the determining the SFN of the radio frame
includes consideration of parameters including a UE identifier of the UE being paged, the DRX period length, a quantity of paging occasions within the DRX period, and the quantity of radio sub-frames suitable for the paging in the radio frame.

3. The method of claim 2, wherein the UE identifier comprises an identifier related to the IMSI of the UE.

4. The method of claim 2, wherein the UE identifier is the IMSI of the UE mod a positive integer.

5. The method of claim 1, wherein the determining the SFN of the radio frame comprises:
determining the SFN according to the following formula:

$$SFN=(PAGING\_DRX\_PERIOD \text{ div } PAGING\_OCCASION\_NUMBER)* (UE\_ID \text{ mod } PAGING\_OCCASION\_NUMBER)+ n*PAGING\_DRX\_PERIOD+\text{Frame Offset}$$

wherein the UE_ID indicates a UE identifier of the UE being paged, the PAGING_DRX_PERIOD indicates the DRX period length, the PAGING_OCCASION_NUMBER indicates a quantity of paging occasions within the DRX period length, the Frame Offset indicates an offset of a frame, and the n is a non-negative integer.

6. The method of claim 1, wherein the determining the SFN of the radio frame comprises:
determining the SFN according to the following formula:

$$SFN=\{(UE\_ID \text{ div } M) \text{ mod } (PAGING\_DRX\_PERIOD \text{ div } PAGING\_OCCASION\_NUMBER)\}* PAGING\_OCCASION\_NUMBER+ n*PAGING\_DRX\_PERIOD+\text{Frame Offset}$$

wherein the UE_ID indicates a UE identifier of the UE being paged, the PAGING_DRX_PERIOD indicates the DRX period length, the PAGING_OCCASION_NUMBER indicates a quantity of paging occasions within the DRX period length, the Frame Offset indicates an offset of a frame, the n is a non-negative integer, and the M indicates the quantity of radio sub-frames suitable for the paging in the radio frame.

7. The method of claim 1, wherein the position of the radio sub-frame is determined according to: (IMSI div Y) mod M, where the IMSI is the IMSI of the UE being paged, the Y is a parameter relating to the DRX period length, and the M is a parameter indicating the quantity of radio sub-frames suitable for the paging in the radio frame.

8. An apparatus, comprising:
a first determining unit, configured to determine a System Frame Number (SFN) of a radio frame, wherein the radio frame is designated for carrying a Paging Radio Network Temporary Identifier (P-RNTI) for a paging of a user equipment (UE) by a network device, the radio frame comprising a plurality of radio sub-frames, the P-RNTI being configured to be transmitted by the network device to the UE in a Physical Downlink Control Channel (PDCCH) within one of the plurality of the radio sub-frames in the radio frame; and
a second determining unit, configured to determine a position of the radio sub-frame configured to be used in the transmission of the P-RNTI, wherein the position is determined by consideration of parameters including an International Mobile Subscriber Identifier (IMSI) of the UE being paged, a Discontinuous Reception (DRX) period length of the UE being paged, and a quantity of radio sub-frames suitable for the paging in the radio frame.

9. The apparatus of claim 8, wherein
the SFN of the radio frame is determined according to the following formula:

$$SFN=(PAGING\_DRX\_PERIOD \text{ div } PAGING\_OCCASION\_NUMBER)* (UE\_ID \text{ mod } PAGING\_OCCASION\_NUMBER)+ n*PAGING\_DRX\_PERIOD+\text{Frame Offset}$$

wherein the UE_ID indicates a UE identifier of the UE being paged, the PAGING_DRX_PERIOD indicates the DRX period length, the PAGING_OCCASION_NUMBER indicates a quantity of paging occasions within the DRX period length, the Frame Offset indicates an offset of a frame, and the n is a non-negative integer.

10. The apparatus of claim 8, wherein
the SFN of the radio frame is determined according to the following formula:

$$SFN=\{(UE\_ID \text{ div } M) \text{ mod } (PAGING\_DRX\_PERIOD \text{ div } PAGING\_OCCASION\_NUMBER)\}* PAGING\_OCCASION\_NUMBER+ n*PAGING\_DRX\_PERIOD+\text{Frame Offset}$$

wherein the UE ID indicates a UE identifier of the UE being paged, the PAGING_DRX_PERIOD indicates the DRX period length, the PAGING_OCCASION_NUMBER indicates a quantity of paging occasions within the DRX period length, the Frame Offset indicates an offset of a frame, the n is a non-negative integer, and the M indicates the quantity of radio sub-frames suitable for the paging in the radio frame.

11. The apparatus of claim 8, wherein the SFN of the radio frame is determined by consideration of parameters including a UE identifier of the UE being paged, the DRX period length, a quantity of paging occasions within the DRX period length, and the quantity of radio sub-frames suitable for the paging in the radio frame.

12. The apparatus of claim 11, wherein the UE identifier comprises an identifier related to the IMSI of the UE.

13. The apparatus of claim 11, wherein the UE identifier is the IMSI of the UE mod a positive integer.

14. The apparatus of claim 8, wherein the apparatus is incorporated into the UE.

15. The apparatus of claim 8, wherein the apparatus is incorporated into the network device.

16. The apparatus of claim 8, wherein the position of the radio sub-frame is determined according to: (IMSI div Y) mod M, where the IMSI is the IMSI of the UE being paged, the Y is a parameter relating to the DRX period length, and the M is a parameter indicating the quantity of radio sub-frames suitable for the paging in the radio frame.

17. A wireless communications apparatus, comprising:
a memory for storing instructions; and
a processor coupled to the memory configured to execute the instructions to allow the apparatus to:
determine a System Frame Number (SFN) of a radio frame, wherein the radio frame is designated for carrying a Paging Radio Network Temporary Identifier (P-RNTI) for a paging of a UE by a network device, the radio frame comprising a plurality of radio sub-frames, the P-RNTI being configured to be transmitted by the network device to the UE in a Physical Downlink Control Channel (PDCCH) within one of the plurality of the radio sub-frames in the radio frame; and
determining a position of the radio sub-frame configured to be used in the transmission of the P-RNTI, wherein the determining the position includes consideration of parameters including an International Mobile Subscriber Identifier (IMSI) of the UE being paged, a Discontinuous Reception (DRX) period length of the UE being paged, and a quantity of radio sub-frames suitable for the paging in the radio frame.

18. The wireless communications apparatus of claim 17, wherein the position of the radio sub-frame is determined according to: (IMSI div Y) mod M, where the IMSI is the IMSI of the UE being paged, the Y is a parameter relating to the DRX period length, and the M is a parameter indicating the quantity of radio sub-frames suitable for the paging in the radio frame.

19. A mobile communications system, comprising: a network device in communication with a user equipment (UE), wherein the network device is configured to:
send a Paging Radio Network Temporary Identifier (P-RNTI) to the UE in a Physical Downlink Control Channel (PDCCH) within a radio sub-frame of a radio frame, wherein a paging message is associated with the P-RNTI, the paging message being configured to be transmitted in a Physical Downlink Shared Channel (PDSCH) within the radio sub-frame; and the UE is configured to:
determine a System Frame Number (SFN) of the radio frame;
determine a position of the radio sub-frame within the radio frame by consideration of parameters including an International Mobile Subscriber Identifier (IMSI) of the UE, a Discontinuous Reception (DRX) period length of the UE, and a quantity of radio sub-frames suitable for paging in the radio frame;
decode the PDCCH within the radio sub-frame;
obtain the P-RNTI in the PDCCH; and
obtain the paging message associated with the P-RNTI.

20. The mobile communications system of claim 19, wherein the position of the radio sub-frame is determined according to: (IMSI div Y) mod M, where the IMSI is the IMSI of the UE being paged, the Y is a parameter relating to the DRX period length, and the M is a parameter indicating the quantity of radio sub-frames suitable for the paging in the radio frame.

* * * * *

UNITED STATES PATENT AND TRADEMARK OFFICE
CERTIFICATE OF CORRECTION

PATENT NO.       : 8,543,140 B2
APPLICATION NO.  : 12/793480
DATED            : September 24, 2013
INVENTOR(S)      : Yinghui Yu It is certified that error appears in the above-identified patent and that said Letters Patent is hereby corrected as shown below:

In the claims

In Column 8, Claim 17, line 63, the word "determining" should read --determine--.

Signed and Sealed this
Twenty-second Day of December, 2015

Michelle K. Lee
*Director of the United States Patent and Trademark Office*